(12) United States Patent
Zuchara

(10) Patent No.: US 6,874,483 B2
(45) Date of Patent: Apr. 5, 2005

(54) CANISTER OF AN EVAPORATED FUEL PROCESSING SYSTEM

(75) Inventor: Pawel Zuchara, Staszow (PL)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/888,078

(22) Filed: Jul. 9, 2004

(65) Prior Publication Data

US 2005/0022796 A1 Feb. 3, 2005

(30) Foreign Application Priority Data

Jul. 11, 2003 (PL) ................................. 361212

(51) Int. Cl.[7] ......................... F02M 25/08; B01D 53/02
(52) U.S. Cl. ........................ 123/519; 96/139; 96/144; 96/152
(58) Field of Search ..................... 123/516, 518, 123/519, 520; 96/139, 143, 144, 152

(56) References Cited

U.S. PATENT DOCUMENTS

| 4,338,106 A | * | 7/1982 | Mizuno et al. ............... 96/139 |
| 5,632,251 A | * | 5/1997 | Ishikawa .................... 123/519 |
| 5,718,209 A | * | 2/1998 | Scardino et al. ............. 123/519 |
| 6,524,374 B2 | * | 2/2003 | Moriyama et al. ............ 96/131 |
| 6,537,354 B2 | * | 3/2003 | Meiller et al. ................ 96/139 |
| 2002/0078931 A1 | * | 6/2002 | Makino et al. .............. 123/519 |

* cited by examiner

Primary Examiner—Weilun Lo
(74) Attorney, Agent, or Firm—Jimmy L. Funke

(57) ABSTRACT

The invention relates to a canister (1) of an evaporated fuel processing system comprising a housing (2) enclosing adsorbing chambers (4, 5) connected in series, where the first adsorbing chamber is connected to a fuel tank (19) and to an intake pipe (20) of an internal combustion engine and the last or outlet adsorbing chamber (5) comprises an atmospheric port. A perforated plate (21) is positioned inside the outlet adsorbing chamber (5) across a vapors flow path. To meet the emission standards and to ensure the proper canister behavior during tank (19) refueling, the perforated plate (21) comprises at least one vapor channel (26) with a valve (27a), extending inside the outlet adsorbing chamber for a distance (h) less than or equal to the thickness (H) of adsorbent layer behind the perforated plate. During use, the valve opens in response to increased pressure to reduce flow resistance through the outlet absorbing chamber, but otherwise remains closed to maximize vapor flow through the absorbent layer. In a preferred embodiment of the canister, the valve in the vapor channel (26) is a pressure controlled direct action valve that opens when flow restriction through the adsorbent layer exceeds the valve opening pressure.

10 Claims, 5 Drawing Sheets

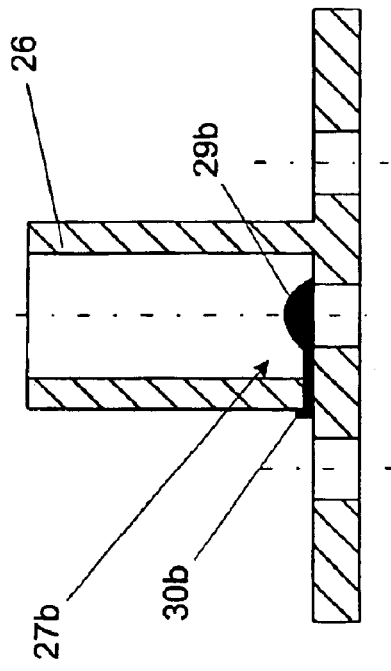
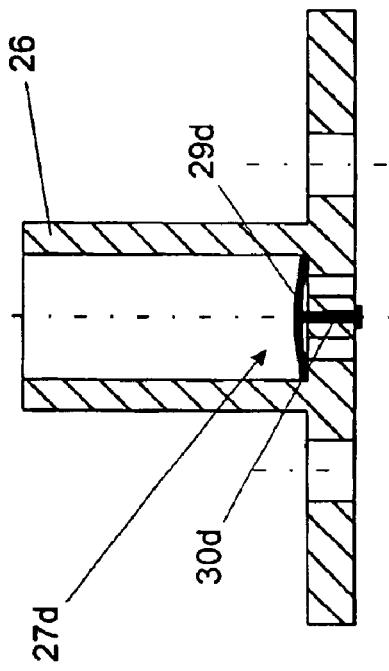
Fig. 3.
Fig. 4.
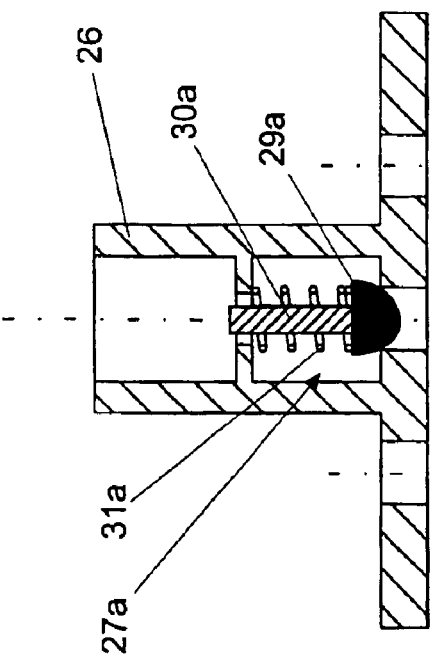
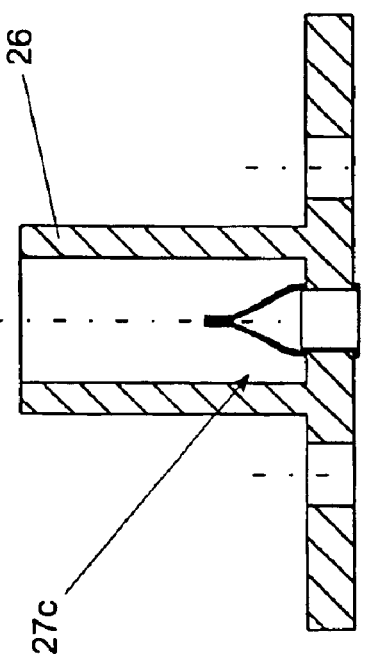
Fig. 5.
Fig. 6.

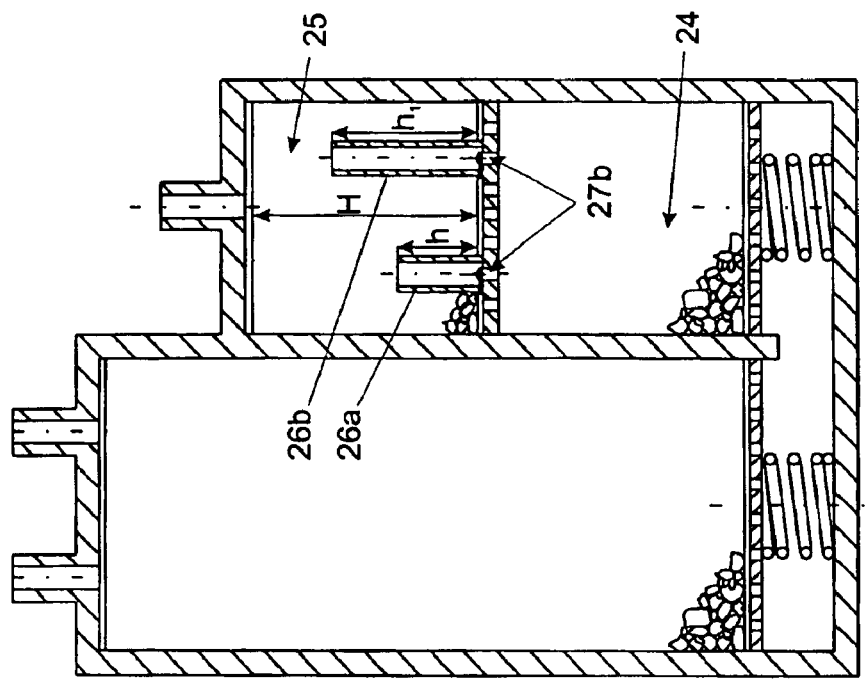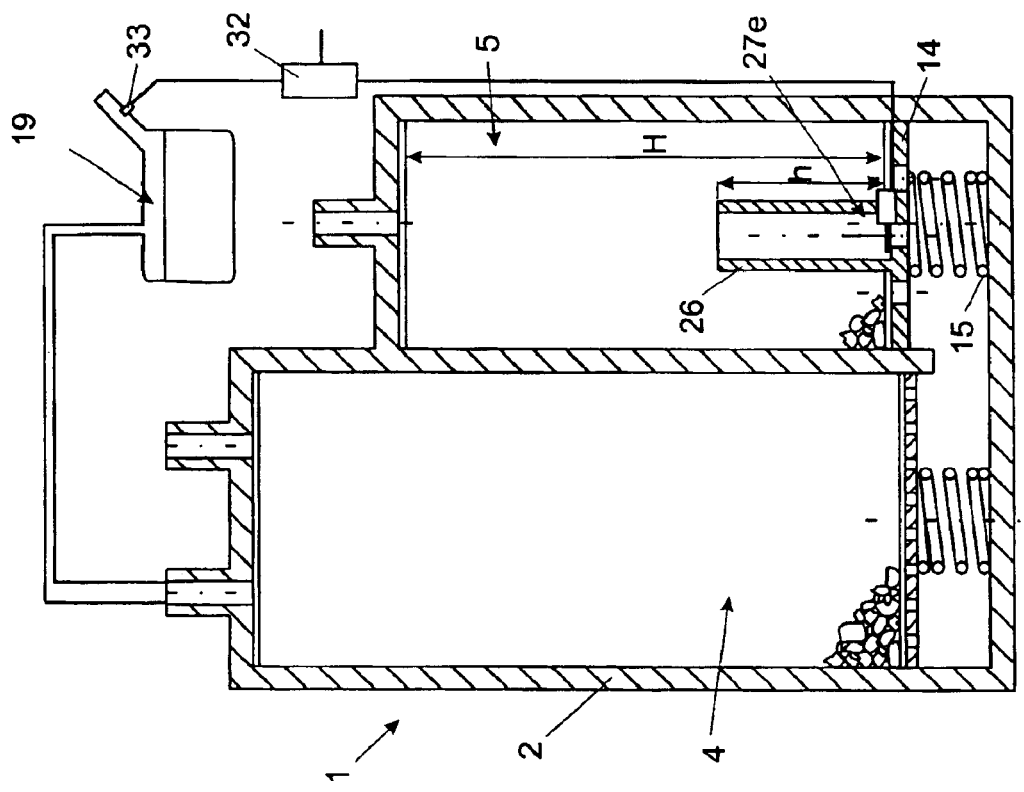

(State of art)

CANISTER OF AN EVAPORATED FUEL PROCESSING SYSTEM

TECHNICAL FIELD

The present invention relates to a canister of an evaporated fuel processing system of an internal combustion engine, that enables both controlled discharge of evaporated fuel into the atmosphere and neutralization of light hydrocarbons contained in evaporated fuel.

BACKGROUND OF THE INVENTION

A conventional canister of an evaporated fuel processing system is disclosed in United States patent Application Publication No. 2002/0078931. The canister houses a plurality of adsorbing chambers connected in series. The first adsorbing chamber is connected to a fuel tank and to an intake pipe of an internal combustion engine and the last or outlet adsorbing chamber comprises an atmospheric port.

The fuel vapours, after entering into the canister from the fuel tank, are captured by the adsorbent included in the chambers. As a rule, activated carbon is used as the chamber-filling agent. After the start of the engine the vapours are inducted by negative pressure of the intake pipe and then burnt inside the combustion chamber. Once adsorptive capability of the first chamber is exhausted, the vapours pass through to successive adsorbing chambers, and after exceeding adsorptive capabilities of the outlet chamber the vapours are discharged into the atmosphere.

To ensure that the container meets requirements of related governmental emission standards, e.g the LEV II (Low-Emission Vehicle Program) or the Zero Evap standard, that are used in use in the USA, emission of the evaporated fuel into the atmosphere must be as low as possible. For this purpose the height of adsorbing chambers must be relatively large, as compared with diameters thereof. In addition, the outlet adsorbing chambers is frequently divided by a partition, thus defining the outer and the inner adsorbing layer. Such a partition produces an additional restraint against vapour flow causing redistribution thereof within the entire volume of the adsorbent below the partition.

Unfortunately, the canisters of the above construction may fail meeting the second requirement that is demanded, which is adsorption of fuel vapour that arises while tank refuelling (onboard refueling vapor recovery —ORVR), where the low resistance to vapour flow is required due to much higher rates of evaporated fuel flow. At high intensity of flow the activated carbon in the adsorbing outlet chamber generates high flow resistance, which may lead to unfavourable behaviour of the canister during tank refuelling. In an extreme case, resistance of the canister may even make the refuelling impossible, as the fuel vapour gauge, installed in a pump gun, cuts the fuel flow out. Resistance to fuel vapour flow is even higher for canisters with a partition installed inside the adsorbing outlet chamber.

SUMMARY OF THE INVENTION

The aim of the presented invention is to provide a canister of an evaporated fuel processing system, which would be free of aforementioned disadvantages, and would make it possible to obtain different operational characteristics of the canister adsorption, depending on intensity of the fuel vapour flow and eventually to meet the related emission standards.

According to the present invention there is provided a canister of an evaporated fuel processing system comprising a housing that encloses adsorbing chambers connected in series, where the first adsorbing chamber is connected to a fuel tank and to an intake pipe of an internal combustion engine and the last or outlet adsorbing chamber comprises an atmospheric port. A perforated plate is located across the vapour flow path inside the outlet adsorbing chamber. The perforated plate comprises at least one vapour channel having a valve and extending for a distance less than or equal to the thickness of the adsorbent layer between the perforated plate and the atmospheric port. When the valve is closed, vapour flow is through the absorbent layer between the perforated plate and the atmospheric port. Alternately, the valve opens to allow a portion of the vapours to flow through the channel, thereby reducing vapour flow through the absorbent layer.

It is favourable according to if the present invention if the perforated plate is a partition with holes; such that the partition divides the outlet absorbing chamber into inner and outer adsorbing layers.

Moreover, it is favourable if the valve in the vapour channel is a pressure-controlled direct action valve that opens when the flow restrictions through the adsorbent layer between the perforated plate and the atmospheric port exceeds the valve opening pressure.

In such a case, according to the present invention, it is favourable if the valve in the vapour channel is a poppet valve, a duckbill valve, a flapper vale or an umbrella valve.

Alternatively, according to the present invention it is advantageous when the valve in the vapour channel is a solenoid valve, actuated by an external signal.

In this embodiment the external signal that enables opening the valve is advantageously produced by a gauge disposed in a fuel tank.

In an alternate embodiment, the perforated plate may comprise a plurality of fuel vapour channels that may extend different distances into the adsorbing layer and/or include valves having different opening pressure values.

The canister according to the present invention is distinguished by particularly good operational characteristics. If flow of evaporated fuel through the canister is low, the entire amount of the adsorbing agent is involved in the adsorption process, whereas at high fuel vapour flow, e.g. during tank refuelling (ORVR), the valve opens and stabilization of pressure is reached. The evaporated fuel passes through the vapour channel and the thinner layer of the adsorbent over the vapour channel until flow rate decreases, which results in the valve closing.

The canister according to the present invention enables both the requirements of emission standards as well as the ORVR regulations to be met, in contrast to canisters of conventional construction.

BRIEF DESCRIPTION OF THE DRAWINGS

The canister of an evaporated fuel processing system of an internal combustion engine, according to the present invention, is shown in its example embodiments with reference to the drawings, of which:

FIG. 3 shows a lateral cross-section of the canister valve from the drawing FIG. 1, FIG. 4 shows a lateral cross-section of another embodiment of the canister valve, FIG. 5 shows a lateral cross-section of one more embodiment of the canister valve, FIG. 6 shows a lateral cross-section of a yet another embodiment of the canister valve, FIG. 7 shows a schematic lateral cross-section of another embodiment of the canister of an evaporated fuel processing system according to the present invention, FIG. 8 shows one more embodiment of the canister of an evaporated fuel processing system according to the present invention.

DESCRIPTION OF THE PREFERRED EMBODIMENT

Figure 1:
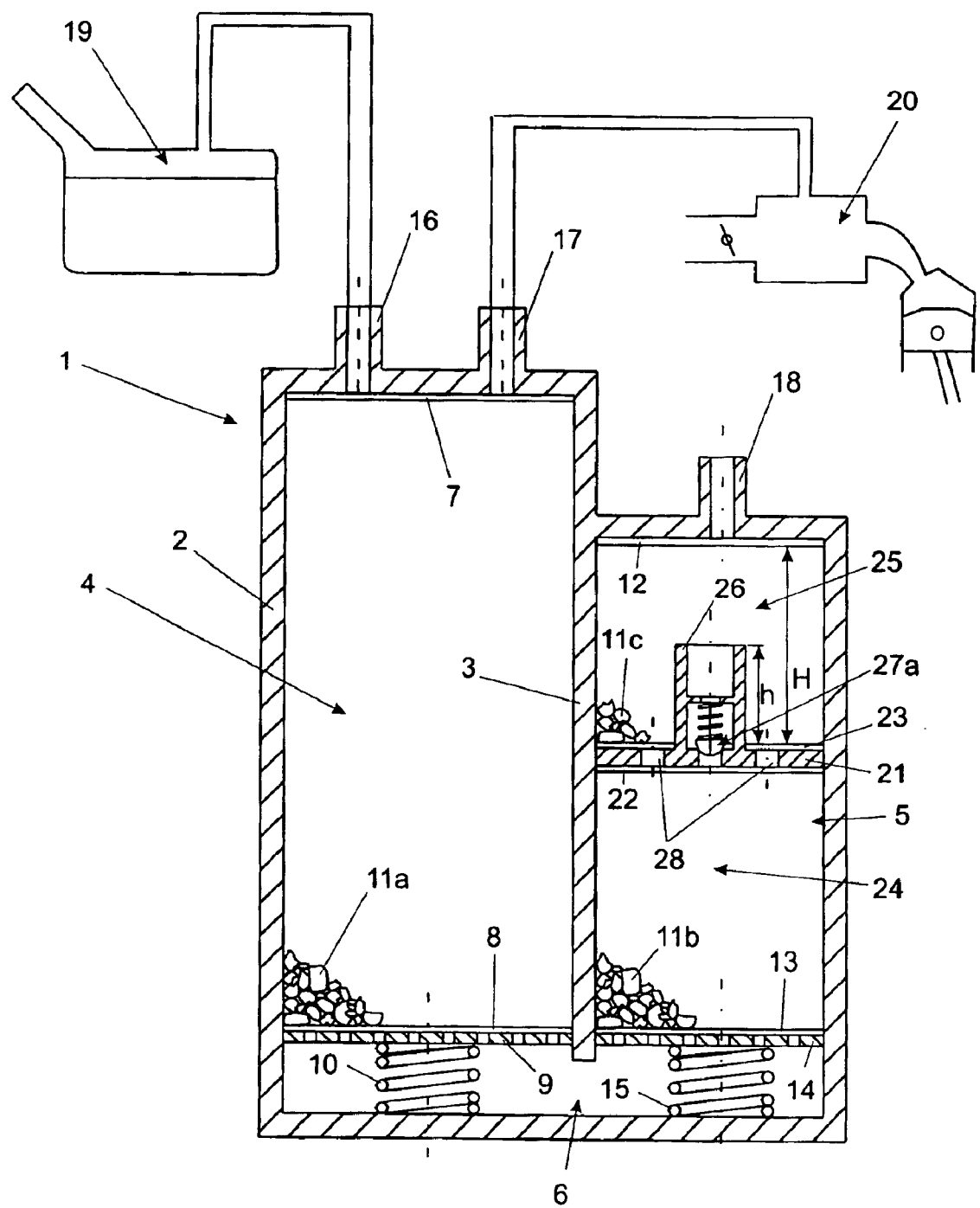
FIG. 1 shows a schematic lateral cross-section of the first embodiment of the canister of an evaporated fuel processing system according to the present invention along with typical components of an evaporated fuel processing system.

As shown in FIG. 1, the canister 1 of an evaporated fuel processing system comprises a housing 2, divided by the wall 3 into two adsorbing chambers 4 and 5 filled with activated carbon. In the first adsorbing chamber 4, the activated carbon 11a is held between filtering covers 7 and 8 permeable to evaporated fuel. The compression force is applied by the perforated plate 9 and the compression spring 10. Similarly, the activated carbon 11b and 11c in the outlet adsorbing chamber 5 is held between filtering layers 12 and 13 that are permeable to evaporated fuel, by the perforated plate 14 and compression spring 15. Filtering covers 8 and 13 protect orifices in perforated plates 9 and 14 from clogging by activated carbon, as well as prevent penetration of activated carbon into the channel 6 below the plates.

The first adsorption channel 4 is connected with the fuel tank 19 by means of the inlet port 16 and with the intake pipe 20 of an internal combustion engine by means of the outlet port 17. The outlet absorbing chamber 5 is discharged to the surrounding atmosphere through the atmospheric port 18. Moreover, the first adsorbing chamber 4 is connected in series with the outlet adsorbing chamber 5 by means of the channel 6 that runs under the wall 3. The filtering covers 7 and 12 protect corresponding orifices 16, 17 and 18 from clogging.

Evaporated fuel, which is released from the fuel tank 19, enters the canister 1 through the inlet port 16 and diffuses into the first adsorbing chamber 4 where absorption of light hydrocarbons occurs. After the start of the engine, the fuel vapours collected in the canister are drawn by negative pressure through the intake pipe 20 and then burnt inside the combustion chamber.

If evaporated fuel pressure is high, vapours pass to the outlet adsorbing chamber 5, from which they may be discharged into the atmosphere through the atmospheric port 18. High temperatures within the ambient environment around the canister is especially conducive to the above phenomenon, as the volume of fuel vapours diffused in adsorption chambers 4 and 5 increases at higher temperatures.

The canister shown in FIG. 1 comprises a partition 21 with holes 28, dividing the adsorbing outlet chamber 5, hence two layers of the adsorbent are defined: the inner layer 24 and the outer layer 25 of thickness H. Filtering covers 22 and 23 protect the holes 28 in the partition 21 from clogging by the activated carbon (cf. drawing FIG. 9). The partition 21 serves also as additional restraint to vapour flow into the outer layer 25 of the adsorbing outlet chamber 5 and brings about redistribution thereof within the entire volume of the activated carbon 11a and 11b. As a result, the entire activated coal inside the canister 1 is involved in adsorption of hydrocarbons from the fuel vapour.

As it is shown in FIG. 1, the vapour channel 26 extend to a depth h into the outer layer 25 formed by the partition 21. The vapour channel 26 comprises a pressure-controlled direct action valve. According to the present embodiment of the invention it is the poppet valve 27a (shown in FIG. 3), which has a closing component 29a mounted on the stem 30a. The valve 27a remains closed due to action of the spring 31, which urges the closing component against appropriate projections inside the vapour channel 26.

Figure 9:
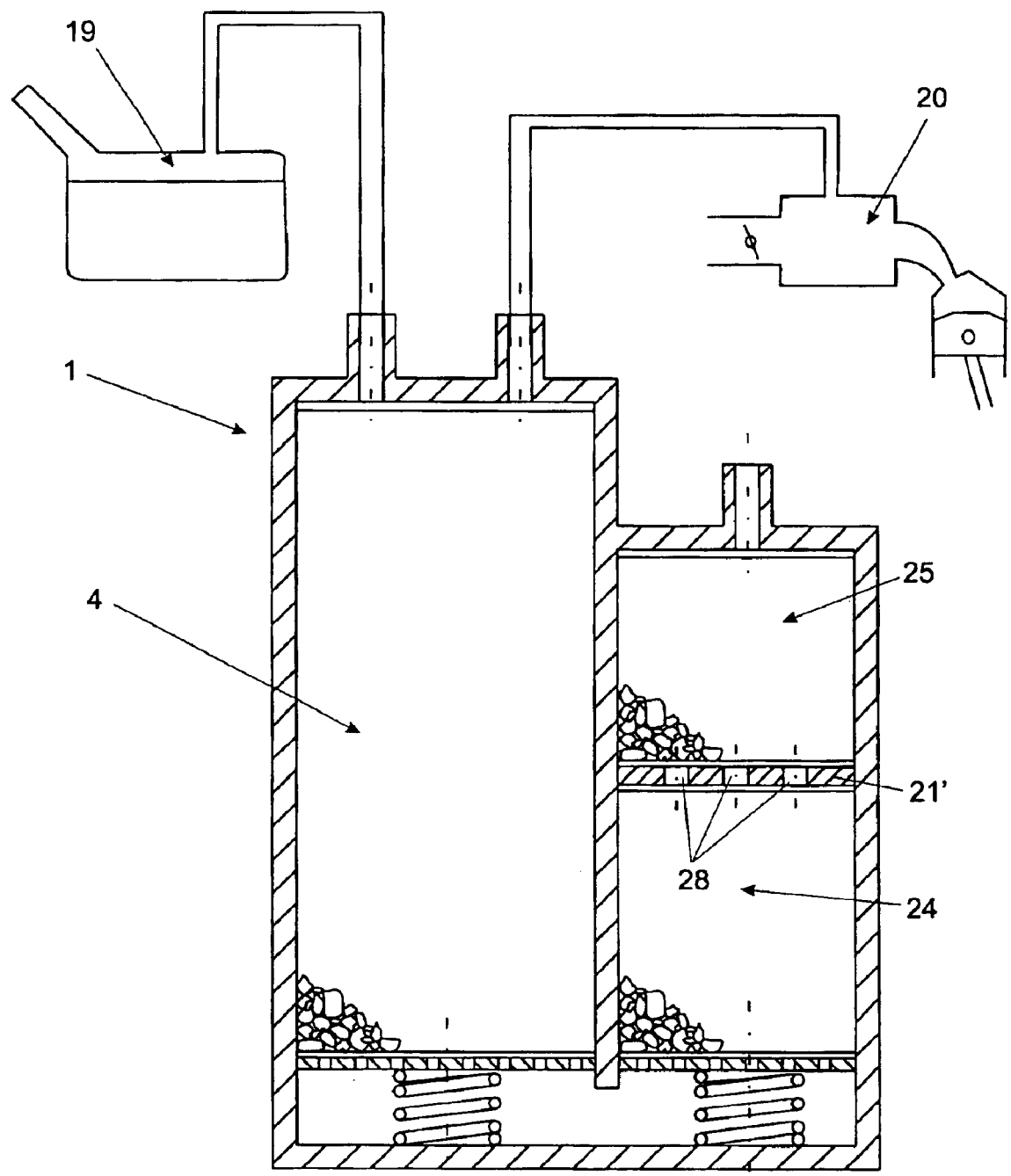
FIG. 9 shows a schematic diagram of a conventional, well-known canister with a partition.

If a pressure of fuel vapours that reach the partition 21 is less than the opening pressure of the valve 27a, the vapour penetrates through holes 28 and farther through the adsorbent layer of thickness H. The above happens if flow rate of the evaporated fuel is low. In such a case the valve 27a remains closed and the canister generally behaves as a typical canister with partition, which is shown in FIG. 9.

The valve 27a opens when flow rate reaches a predetermined value, when restrictions of the adsorbent layer along the distance h leads to pressure growth below the partition that exceeds the opening pressure of the valve. On the other hand, as the vapour channel 26 with the valve is inserted into the outer layer 25 to a certain depth h, the vapour bypasses a part of adsorbent over the partition 21, thus the flow resistance is lower. In this embodiment the opening pressure of the valve 27a is adjusted proportionally to the depth h of the vapour channel 26 insertion.

The valve remains open at high flow rates. A decrease of the flow rate results in reducing flow resistance and finally in closing of the valve.

Figure 2:
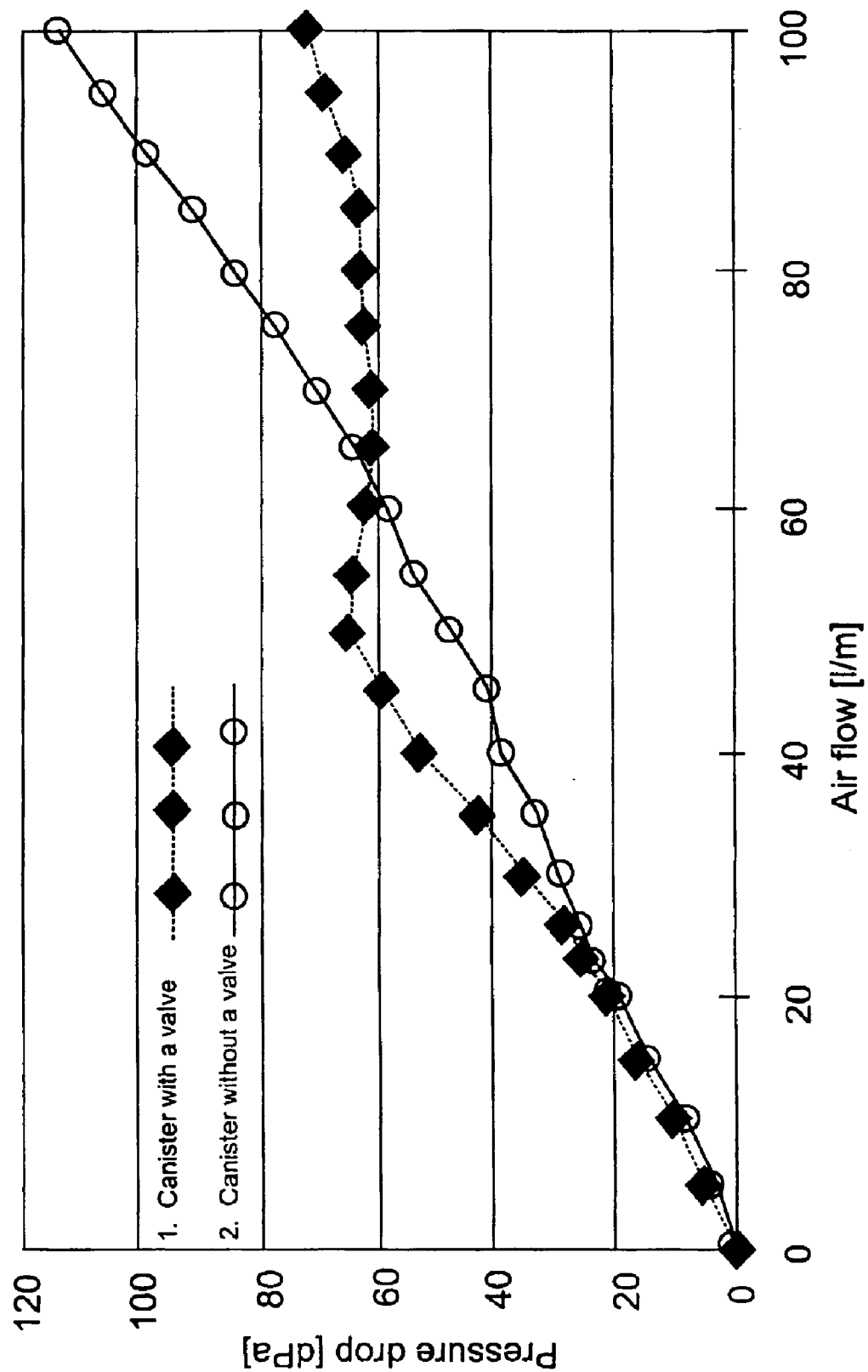
FIG. 2 shows a graph of pressure drop vs. flow rate of fuel vapours through the canister, for the first embodiment of the canister according to the present invention as shown in FIG. 1, and for a typical canister with partition (as shown in FIG. 9)

The FIG. 2 shows the measured dependence of pressure drop (flow resistance) vs. flow rate of the air stream flowing through the canister according to the present invention (curve 1, drawing FIG. 1) compared to a conventional canister with a partition (curve 2, drawing FIG. 1).

As shown, the pressure drop is substantially proportional to the flow rate of the evaporated fuel and, at a defined flow rate, for a conventional canister, refuelling the vehicle can be even impossible. The threshold value of flow resistance depends on a number of factors, which include, among others, a capacity of the fuel tank and a shape of the filler neck.

In case of a canister with a valve, pressure drop increases much faster until a certain value of flow rate is reached, since the area of orifices that is available for vapour flow through the partition is reduced, due to the area occupied by the closed valve. At a certain flow rate, the valve opens, and flow resistance increases at a slower rate. The slight decrease in flow resistance which is observed immediately after opening of the valve results from specific circumstances of the executed experiment and can be explained by a presence of non-saturated activated carbon just above the vapour channel.

The drawings FIG. 4 to FIG. 6 present other embodiments of the valve mounted in the partition 21.

The valve 27b in FIG. 4 is a flapper valve. The elastic closing element 29b made of plastic material is mounted on a tongue 30b attached to an orifice in the vapour channel wall 26.

The valve 27c in FIG. 5 is a rather simple valve of duckbill type. The valve is made of plastic material and mounted to an orifice in the partition 21.

FIG. 6 shows the valve 27d, which is an umbrella valve. The closing element 29d of the valve along with its stem 30d is mounted in an appropriate orifice in the partition 21.

The presented embodiments of a valve in the partitioning plate are provided solely to illustrate operating principles of the apparatus and in any case cannot be considered as exhausting solutions to which the invention is limited.

The drawing FIG. 7 presents another embodiment of a canister according to the present invention. As it can be seen, the adsorbing outlet chamber 5 has no partition and the vapour channel is defined in the perforated plate 14 over the spring 15.

Moreover, in this embodiment the valve in the vapour channel is a solenoid valve 27e, connected to the control circuit 32, which actuates the valve and opens it depending on pressure of evaporated fuel inside the fuel tank 19. The pressure value is measured by means of a gauge 33.

Operation of the canister is similar to the canisters in FIGS. 1 through 6. When the flow rate of evaporated fuel is low, the valve 27e remains closed. Increases in the vapour pressure in the fuel tank 19 during refuelling activates the pressure gauge 33. In response, the control circuit 32 produces a suitable electric signal that actuates solenoid of the valve 27e and the valve opens. Since, the vapour channel 26, in which the valve is disposed, extends to a certain depth h into the outlet adsorbing chamber 5, the vapour bypasses a part of adsorbent over the partitioning plate 14. Flow resistance is lower, hence further increases in the vapour pressure inside the fuel tank 19, which would make refuelling impossible, is avoided. Obviously, a drop in the evaporated fuel pressure inside the fuel tank 19 is recorded by the gauge 33 and the control circuit 32 provides a suitable signal that closes the valve 27e.

FIG. 9 illustrates one more embodiment of a canister, which includes the partition 21 with two vapour channels 26a and 26b of depths h and h1 respectively. The presented embodiment comprises two flapper valves, one per each channel, with different values of opening pressure, wherein opening pressure of the valve in the shortest vapour channel 26a is the lowest. As a result, the valve in the vapour channel 26a opens first and the valve in the vapour channel 26b operates as a safety valve, i.e. it opens only when the reduction in flow resistance, caused by opening the valve in the vapour channel 26a, proves to be insufficient.

By appropriate selection of a number of channels as well as the height and diameter for each of them together with individual opening pressures, a large variety of operational characteristics of the canister can be obtained. It is possible to dispose the vapour channels both in the perforated plate, over a compressing spring, and in the partition of the outlet adsorbing chamber.

What is claimed is:

1. A canister for an evaporated fuel processing system comprising a housing, defining a first absorbing chamber and a second absorbing chamber connected in series, said first adsorbing chamber being connected to a fuel tank and to an intake pipe of an internal combustion engine, said second adsorbing chamber is connected to an atmospheric port and comprises a perforated plate and a vapour absorbing layer between said perforated plate and said atmospheric port, said vapour absorbing layer providing a vapour flow path between the perforated plate and the atmospheric port and having a thickness indicative of said vapour flow path, said perforated plate comprising a vapour channel extending within said absorbing layer a distance less than or equal to the thickness of the absorbent layer and including a valve, such that when the valve is closed, vapour flow through the second absorbing chamber is through the vapour flow path between the perforated plate and the atmospheric port, and when the valve is open, a portion of the vapour flow is through the channel, thereby reducing vapour flow through the vapour flow path.

2. A canister according to claim 1, characterised in that the perforated plate is a partition having holes and dividing the outlet adsorbing chamber into inner and outer adsorbing layers.

3. A canister according to claim 1, characterised in that the valve in the vapour channel is a pressure controlled direct action valve having a valve opening pressure such that the valve opens when vapour flow restriction through the adsorbent layer exceeds the valve opening pressure.

4. A canister according to claim 3, characterised in that the valve in is a poppet valve.

5. A canister according to claim 3, characterised in that the valve in the vapour channel is a duckbill valve.

6. A canister according to claim 3, characterised in that the valve is a flapper valve.

7. A canister according to claim 3, characterised in that the valve is an umbrella valve.

8. A canister according to claim 1, characterised in that the valve in is a solenoid valve actuated by an external signal.

9. A canister according to claim 8, characterised in that the external signal for opening the valve is produced by a gauge disposed in a fuel tank.

10. A canister according to claim 1, characterised in that the perforated plate comprises multiple the vapour channels extending into the absorbing layer and having different heights, each said vapour channel having a valve, wherein the valves have different opening pressures.

* * * * *